(12) United States Patent
Volker et al.

(10) Patent No.: US 7,261,379 B2
(45) Date of Patent: Aug. 28, 2007

(54) RECLINING VEHICLE SEAT HINGE ASSEMBLY

(75) Inventors: Otto J. Volker, Rochelle, IL (US);
Nathan D. Lewis, Oregon, IL (US);
Billy Lee Larson, Elizabeth, IL (US)

(73) Assignee: Dura Global Technologies, Inc.,
Rochester, Hills, MI (US)

(*) Notice: Subject to any disclaimer, the term of this patent is extended or adjusted under 35 U.S.C. 154(b) by 0 days.

(21) Appl. No.: 10/656,908

(22) Filed: Sep. 5, 2003

(65) Prior Publication Data

US 2005/0052063 A1 Mar. 10, 2005

(51) Int. Cl.
*B60N 2/02* (2006.01)
(52) U.S. Cl. .................................. 297/367
(58) Field of Classification Search ............ 297/367
See application file for complete search history.

(56) References Cited

U.S. PATENT DOCUMENTS

| | | | |
|---|---|---|---|
| 4,348,050 A | | 9/1982 | Letournoux et al. |
| 5,328,241 A | | 7/1994 | Haider |
| 5,590,931 A | * | 1/1997 | Fourrey et al. ............ 297/366 |
| 5,769,494 A | * | 6/1998 | Barrere et al. ............ 297/367 |
| 6,003,945 A | * | 12/1999 | Kojima ................... 297/367 |
| 6,085,386 A | * | 7/2000 | Blanchard et al. .......... 16/325 |
| 6,095,608 A | | 8/2000 | Ganot et al. |
| 6,102,480 A | | 8/2000 | Asano |
| 6,112,370 A | * | 9/2000 | Blanchard et al. .......... 16/325 |
| 6,325,458 B1 | | 12/2001 | Rohee et al. |
| 6,328,382 B1 | | 12/2001 | Yamashita |
| 6,328,383 B2 | | 12/2001 | Rohee et al. |
| 6,332,649 B1 | | 12/2001 | Vossmann |
| 6,390,557 B1 | | 5/2002 | Asano |
| 6,454,354 B1 | | 9/2002 | Vossmann et al. |
| 6,561,585 B2 | | 5/2003 | Cilliere et al. |
| 6,626,495 B2 | | 9/2003 | Okazaki et al. |
| 6,669,297 B2 | | 12/2003 | Cilliere et al. |
| 6,676,217 B2 | | 1/2004 | Lange |
| 6,688,695 B2 | | 2/2004 | Pleskot |

(Continued)

FOREIGN PATENT DOCUMENTS

EP 1 225 085 7/2002

(Continued)

OTHER PUBLICATIONS

International Search Report—PCT/US2004/028861.

*Primary Examiner*—Joe Edell
(74) *Attorney, Agent, or Firm*—Greg Cohan; Banner & Witcoff Ltd.; Dean B. Watson (57) ABSTRACT

A reclining vehicle seat hinge assembly includes a first housing, a second housing having a plurality of teeth, a primary cam member having a pair of primary camming surfaces, and a secondary cam having a plurality of camming surfaces and driveable by the primary cam. Each of a pair of primary pawls is configured to be driven into an engaged position by a primary camming surface of the primary cam and into a disengaged position by a corresponding camming surface of the secondary cam. Each of a pair of secondary pawls has the same construction as the primary pawls and is configured to be driven into engaged and disengaged positions by corresponding camming surfaces of the secondary cam.

32 Claims, 7 Drawing Sheets

U.S. PATENT DOCUMENTS

| | | |
|---|---|---|
| 6,715,836 B1 | 4/2004 | Chen et al. |
| 6,722,738 B2 * | 4/2004 | Uramichi .................... 297/367 |
| 6,742,844 B2 | 6/2004 | Pollack |
| 6,749,263 B2 | 6/2004 | Peters |
| 7,100,987 B2 * | 9/2006 | Volker et al. ............... 297/367 |
| 2002/0096925 A1 * | 7/2002 | Uramichi .................... 297/367 |
| 2002/0125756 A1 | 9/2002 | Asano |
| 2003/0025377 A1 | 2/2003 | Peters |
| 2003/0230923 A1 | 12/2003 | Uramichi |
| 2004/0061369 A1 | 4/2004 | Reubeuze et al. |

FOREIGN PATENT DOCUMENTS

| | | |
|---|---|---|
| GB | 2117440 | 10/1983 |

* cited by examiner

RECLINING VEHICLE SEAT HINGE ASSEMBLY

FIELD OF THE INVENTION

This invention relates generally to a reclining vehicle seat hinge assembly, and, in particular, to a reclining vehicle seat hinge assembly with improved strength to weight ratio and reduced chuck.

BACKGROUND OF THE INVENTION

Reclining vehicle seat hinge assemblies are well known in the art, and typically include pawls with a plurality of teeth that releasably engage a circular set of teeth in a housing attached to the seat. Upon movement of a lever, the pawl teeth are released from engagement with the housing teeth, allowing the user to pivot the seat back to a desired position. When the desired position is reached, the lever is released and the pawl teeth engage the housing teeth, locking the seat back at the desired position. Many known reclining vehicle seat hinge assemblies include a pair of pawls with teeth that engage the housing teeth. Such assemblies with just a pair of pawls must have a substantial thickness in order to provide the strength required to absorb the impact forces that result when the vehicle is involved in a collision.

U.S. Pat. No. 6,561,585 to Cilliere et al. discloses a vehicle seat hinge assembly having a first pair of pawls, or locking slugs, that engage housing teeth and act to lock the seat back in the desired position. A second pair of blocking slugs with side surfaces having dihedral angles is positioned such that they allow some play in the circumferential direction. In normal use, the blocking slugs produce no effect. Upon an impact, the blocking slugs deform the guides along which they travel so as to pivot and wedge into an interfering fit with the teeth of the housing, helping to absorb the impact forces. Cilliere is limiting in that its four pawl construction is quite complex, which leads to increased manufacturing costs. Further, Cilliere's inertially operated mechanism requires the shape of the blocking slugs and associated components to be manufactured to close tolerances in order to operate in the designed manner, further contributing to increased manufacturing costs and complexity of design.

It is an object of the present invention to provide a reclining vehicle seat hinge assembly that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

In accordance with a first aspect, a reclining vehicle seat hinge assembly includes a first housing and a second housing rotatable with respect to the first housing. The second housing has a circular shoulder and a plurality of teeth extending radially inward from the shoulder. A primary cam member is rotatable with respect to the first housing and has a pair of primary camming surfaces. A secondary cam member is rotatably driveable by the primary cam and has a plurality of camming surfaces. Each of a pair of diametrically opposed primary pawl is slidable radially with respect to the first housing, has a first and a second cam engaging member and a plurality of radially outward extending teeth, and is configured to be driven radially outward by engagement with the primary cam into an engaged position where the teeth of the primary pawl engage with the teeth of the second housing, and to be driven radially inward by the secondary cam into a disengaged position where the teeth of the primary pawl are free of the teeth of the second housing. Each of a pair of diametrically opposed secondary pawls is slidable radially with respect to the first housing, has a plurality of radially outward extending teeth, and is configured to be driven radially outward by engagement with the secondary cam into an engaged position where the teeth of the secondary pawl engage with the teeth of the second housing, and to be driven radially inward by engagement with the secondary cam into a disengaged position where the teeth of the secondary pawl are free of the teeth of the second housing.

In accordance with another aspect, a reclining vehicle seat hinge assembly includes a seat pan and a seat back pivotally connected to the seat pan. A hinge assembly pivotally connects the seat back to the seat pan and includes a first housing secured to the seat pan. A second housing is secured to the seat back, is pivotable with respect to the first housing, and has a circular shoulder and a plurality of teeth extending radially inward from the shoulder. A primary cam member is rotatable with respect to the first housing and has a pair of primary camming surfaces. A secondary cam member is rotatably driveable by the primary cam and has a plurality of camming surfaces. Each of a pair of primary pawls is slidable radially with respect to the first housing upon engagement with a corresponding primary camming surface of the primary cam and a corresponding camming surface of the secondary cam, and has a plurality of radially outward extending teeth engageable with the teeth of the second housing. Each of a pair of secondary pawls is slidable radially with respect to the first housing upon engagement with a corresponding camming surface of the secondary cam and has a plurality of radially outward extending teeth engageable with the teeth of the second housing. The secondary pawls have a construction identical to that of the primary pawls.

In accordance with a further aspect, a reclining vehicle seat hinge assembly includes a first housing having a plurality of guide surfaces formed thereon. A second housing is rotatable with respect to the first housing, and has a circular shoulder and a plurality of teeth extending radially inward from the shoulder. A primary cam is rotatable with respect to the first housing and has a pair of primary camming surfaces. A primary spring is engageable with the primary cam member to bias the primary cam member into an engaged position. A secondary cam is rotatably driveable by the primary cam and has a first pair of diametrically opposed slots having first and second camming surfaces, and a second pair of diametrically opposed slots having a camming surface. A secondary spring is engageable with the secondary cam to rotatably bias the secondary cam with respect to the primary cam. Each of a pair of diametrically opposed primary pawls is slidable along a corresponding pair of guide surfaces of the first housing, and has a plurality of radially outward extending teeth and a first and a second cam engaging member. The second camming member is engageable by a corresponding primary camming surface of the primary cam to drive the primary pawl into an engaged position where the teeth of the primary pawl engage with the teeth of the second housing. The first cam engaging member is engageable by a camming surface of a corresponding one of the second pair of slots to drive the primary pawl into a disengaged position where the teeth of the primary pawl are free of the teeth of the second housing. Each of a pair of diametrically opposed secondary pawls is slidable along a corresponding pair of guide surfaces of the first housing, and has a plurality of radially outward extending teeth and first and second cam engaging members. The first cam engaging member is engageable by a corresponding first camming surface of a corresponding one of the first pair of slots to drive the secondary pawl radially outward into an engaged position where the teeth of the secondary pawl engage with the teeth of the second housing. The first cam engaging member is engageable by a corresponding second camming surface of the corresponding one of the first pair of slots to drive the secondary pawl into a disengaged position where the teeth of the secondary pawl are free of the teeth of the second housing.

Substantial advantage is achieved by providing a reclining vehicle seat hinge assembly having a primary pair of pawls and a secondary pair of pawls, with each of the pawls having identical construction. In particular, since each of the pawls has the same construction, inventory, handling and manufacturing costs can be reduced. Additionally, since four pawls are used, the thickness of the components of the hinge assembly can be reduced, reducing the weight of the hinge assembly. This is highly advantageous, since reducing the weight of vehicle components helps to achieve fuel efficiency. Further, the use of primary and secondary pairs of pawls reduces chuck, that is, pivotal movement of the seat back relative to the seat pan when the seat back is in its engaged position. The primary pawls and secondary pawls are configured to be driven into engagement independently, ensuring that full engagement of both sets of pawls is realized for a wide range of manufacturing tolerances.

These and additional features and advantages of the invention disclosed here will be further understood from the following detailed disclosure of certain preferred embodiments.

The figures referred to above are not drawn necessarily to scale and should be understood to present a representation of the invention, illustrative of the principles involved. Some features of the reclining vehicle seat hinge assembly depicted in the drawings have been enlarged or distorted relative to others to facilitate explanation and understanding. The same reference numbers are used in the drawings for similar or identical components and features shown in various alternative embodiments. Reclining vehicle seat hinge assemblies as disclosed herein, would have configurations and components determined, in part, by the intended application and environment in which they are used.

DETAILED DESCRIPTION OF CERTAIN PREFERRED EMBODIMENTS

Figure 1:
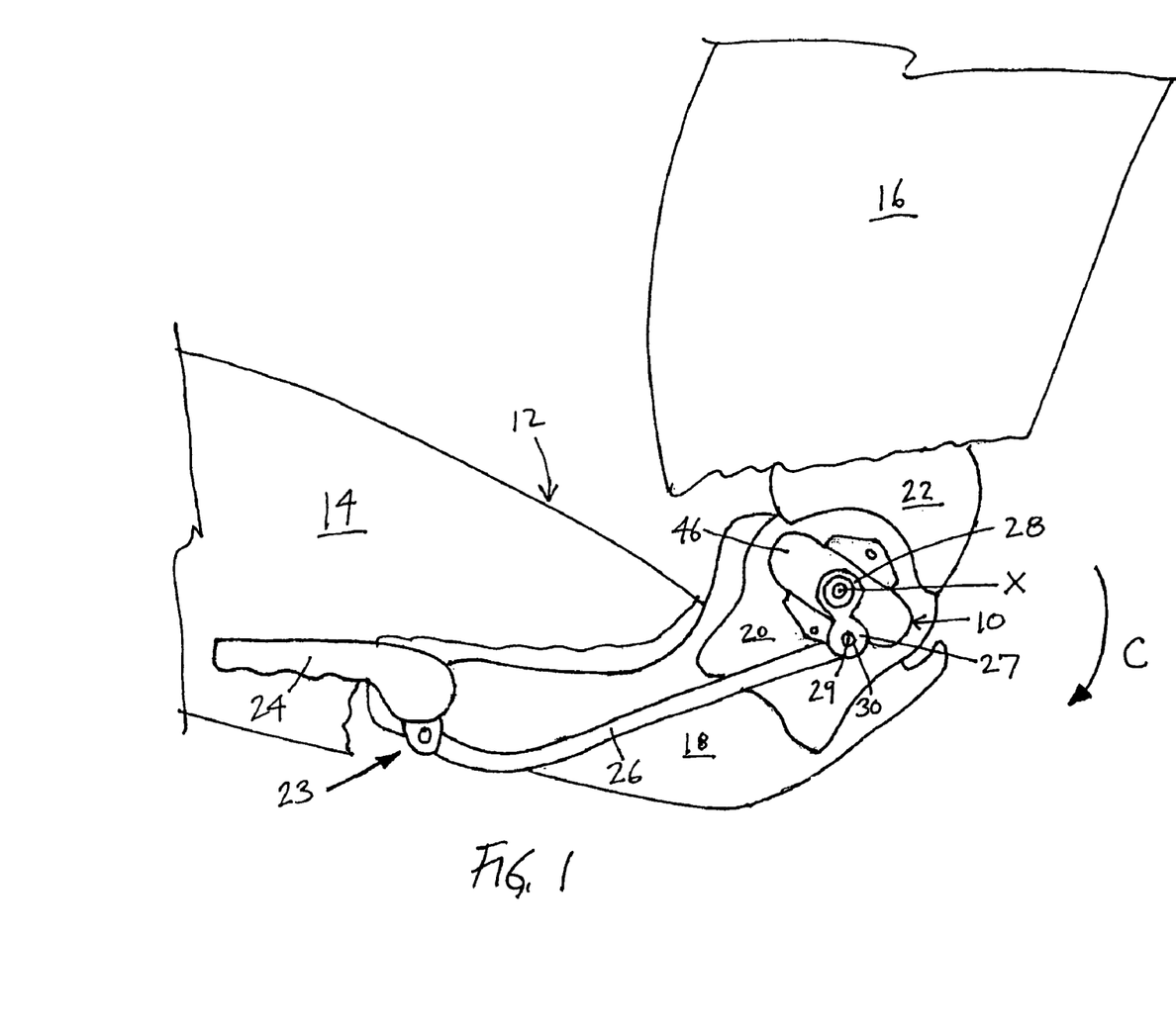
FIG. 1 is an elevation view, shown partially broken away, of a preferred embodiment of a hinge assembly of the present invention, shown installed on a vehicle seat.

The present invention may be embodied in various forms. A preferred embodiment of a hinge assembly 10 for a reclining vehicle seat 12 is shown in FIG. 1. Vehicle seat 12 has a seat pan 14 and a seat back 16, which is pivotally secured to seat pan 14 about a pivot axis X by hinge assembly 10. A first bracket or frame member 18 is secured at one end thereof to a first housing 20 of hinge assembly 10 and at a second end thereof to seat pan 14. Thus, hinge assembly 10 is rigidly secured to seat pan 14 by way of first frame member 18 and first housing 20. A second bracket or frame member 22 is secured at a first end thereof to a second housing 23 of hinge assembly 10 (seen in FIG. 2) and at a second end thereof to seat back 16.

An actuator for hinge assembly 10, such as an actuating assembly 23, includes a lever 24 pivotally secured to seat pan 14. A first end of a link arm 26 is in turn pivotally secured to lever 24, and a second end of link arm 26 is pivotally secured to a flange 27 of a cam locking member 28 of hinge assembly 10. A pin 29 on link arm 26 pivotally engages an aperture 30 formed in flange 27. To regulate the amount that seat back 16 is reclined, a user grasps and pulls lever 24, placing hinge assembly 10 in a disengaged or unlocked position (described in greater detail below), which allows seat back 16 to pivot about axis X. Once seat back 16 is in the desired position, the user releases lever 24 and hinge assembly 10 returns to its engaged or locked position.

The hinge assembly 10 illustrated in FIG. 1 and discussed herein is a hinge assembly for an outboard side of a seat. In the illustrated embodiment, hinge assembly 10 is a left hand hinge assembly for a left seat 12 of a vehicle. It is to be appreciated that a corresponding hinge assembly may be mounted to the right hand side of seat 12. The right hand side hinge assembly would be a mirror image of hinge assembly 10, except that flange 27 is not required on the right hand, or inboard side, since only a single lever is required to operate the seat. Accordingly, an outboard hinge assembly for a right hand seat would be a mirror image of the hinge assembly 10 illustrated herein, and a corresponding inboard hinge assembly for a right hand seat would be identical to the hinge assembly illustrated herein, except that it would not require a flange on its cam locking member.

A connecting rod (not shown) connects the left and right hinge assemblies of a seat in known fashion. It is to be appreciated that in certain preferred embodiments, a lever, such as lever 24, may be directly connected to the connecting rod, which would engage and drive cam locking member 28 without the need for link arm 26 or its associated components.

Figure 2:
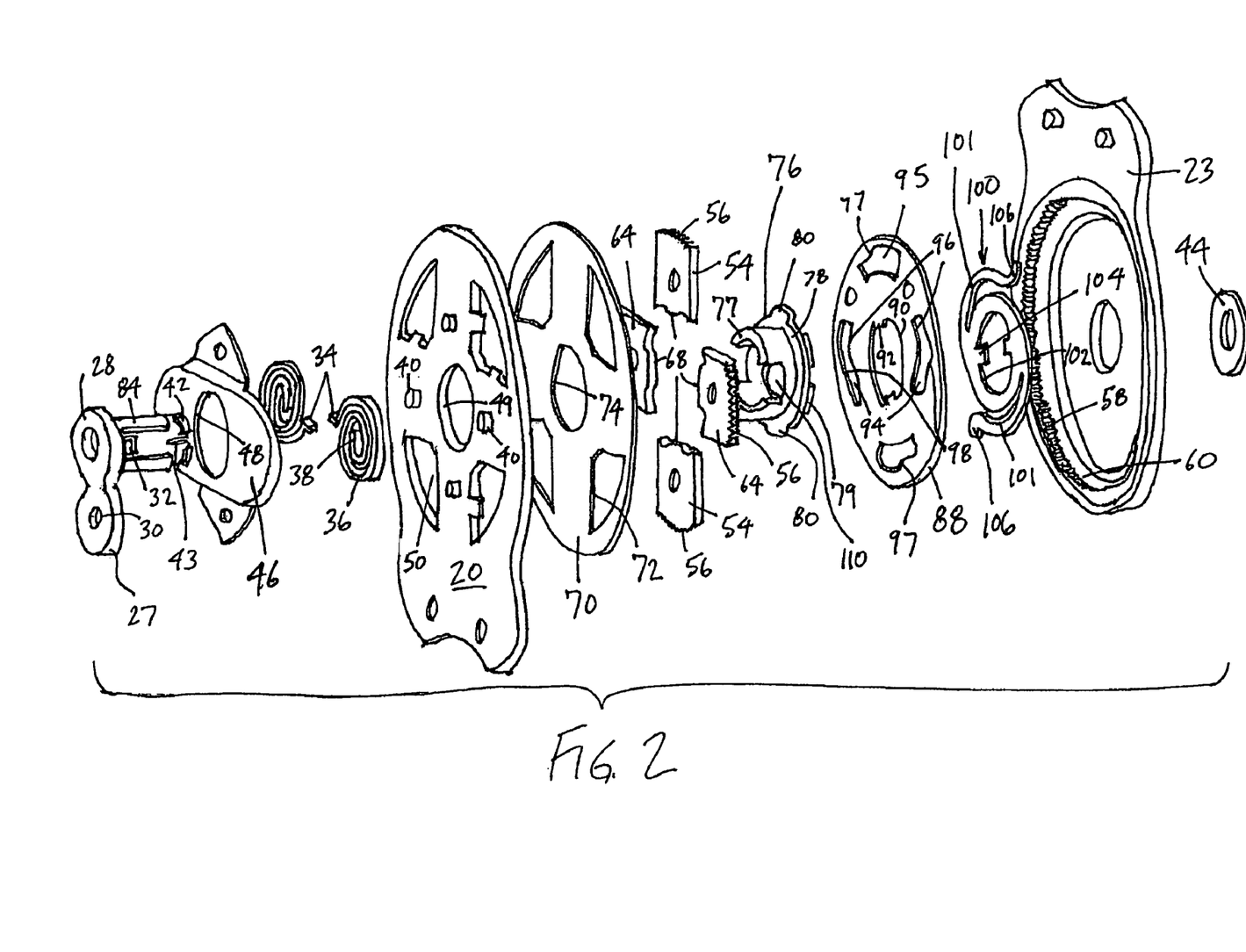
FIG. 2 is a perspective view, in exploded form, of the hinge assembly of FIG. 1.
Figure 3:
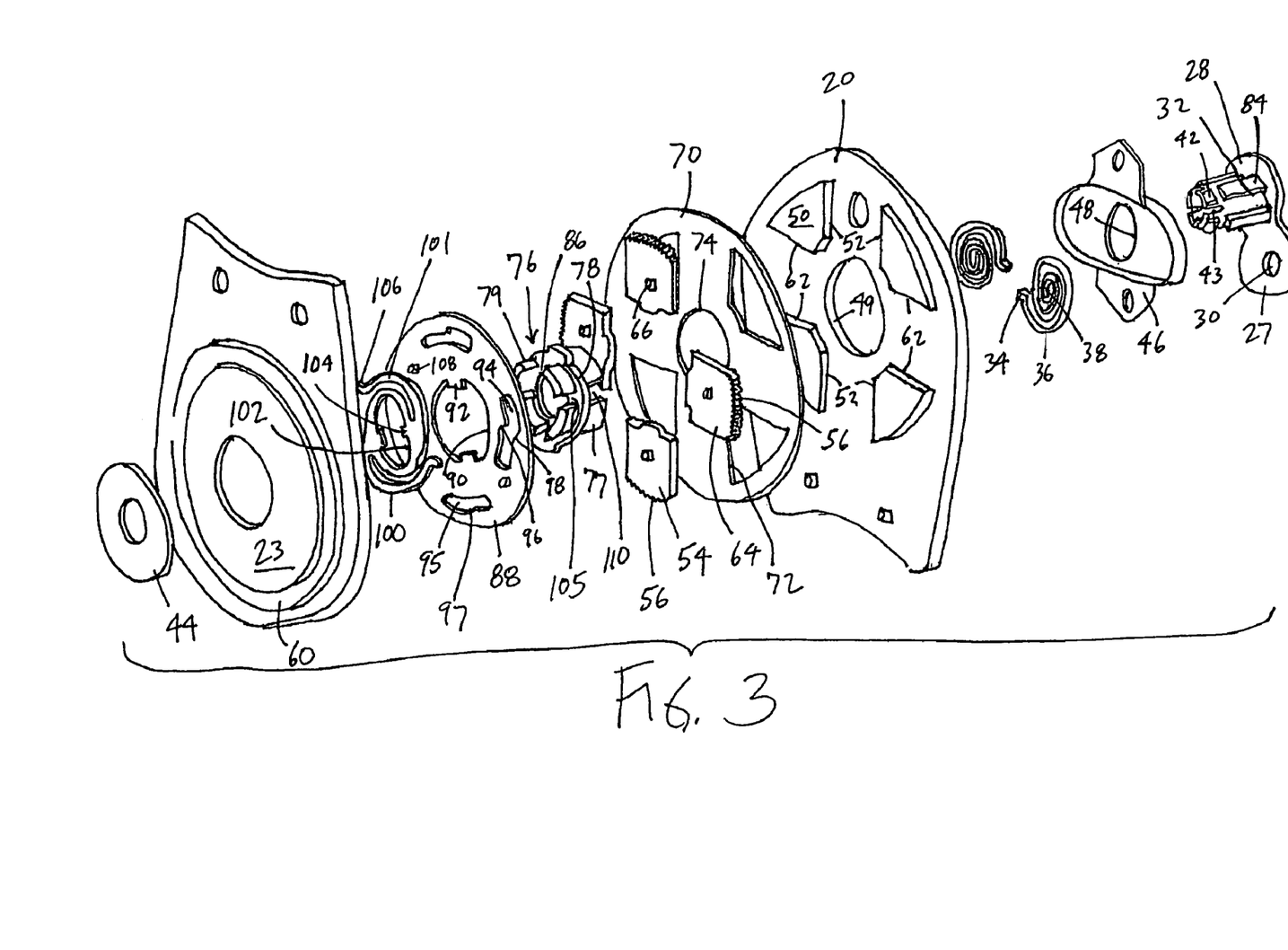
FIG. 3 is a perspective view, in exploded form, of the hinge assembly of FIG. 1.

Hinge assembly 10 is shown in exploded form in FIGS. 2-3. Cam locking member 28 is positioned on an outer side of hinge assembly 10, and has a pair of apertures 32 formed in opposed sides thereof. When used herein, unless otherwise indicated, the term "outer" refers to the side of hinge assembly 10, or any other element, that is outboard with respect to the seat to which hinge assembly 10 is secured, that is, toward the exterior of the vehicle with respect to the seat, and refers to an axial direction with respect to hinge assembly 10. Accordingly, the term "inner," unless otherwise indicated, refers to the side of hinge assembly 10, or any other element, that is inboard with respect to the seat, that is, toward the interior of the vehicle, and refers to an axial direction with respect to hinge assembly 10.

First ends 34 of primary springs 36 extend through apertures 32 and engage a primary cam 76, as described in greater detail below with respect to FIG. 4. Second ends 38 of primary springs 36 are wrapped around projections 40 formed on first housing 20, thereby rotatably securing primary springs 36 to first housing 20. Primary springs 36 are housed in a spring housing 46 that is secured to an outer side of first housing 20. An aperture 48 formed in spring housing 46 receives cam locking member 28 and primary cam 76.

A plurality of radially outward extending tabs 42 are formed proximate an inner end of cam locking member 28. Tabs 42 cooperate in a snap-fit manner with a washer 44 positioned on an inner side of hinge assembly 10 to retain the components of hinge assembly 10 together when hinge assembly 10 is in its assembled condition. Slots 43 may be formed in cam locking member 28, and extend axially along cam locking member 28 from its inner peripheral edge between adjacent tabs 42. Slots 43 allow the inner end of cam locking member 28 and tabs 42 to flex, such that tabs 42 can be snap fit onto washer 44. In a preferred embodiment, cam locking member 28 is formed of plastic, however, other suitable materials will become readily apparent to those skilled in the art, given the benefit of this disclosure.

It is to be appreciated that although the illustrated embodiment shows a pair of primary springs 36, certain preferred embodiments may have a single primary spring, or more than two primary springs, which are anchored to first housing 20. As discussed in greater detail below, primary springs 36 serve to bias a primary cam into an engaged position. In the illustrated embodiment, primary springs 36 are clock springs. It is to be appreciated that many types of springs or biasing members can be used for primary springs 36, each of which are considered to be within the scope of the present invention, including, for example, tension springs and disk springs. Other suitable biasing members will become readily apparent to those skilled in the art, given the benefit of this disclosure.

A central aperture 49 in first housing 20 receives cam locking member 28. Bosses 50 formed on an inner side of first housing 20 form pairs of primary guide surfaces 52 along which a pair of primary pawls 54 slide. Primary pawls 54 are preferably diametrically opposed from one another, and have a plurality of teeth 56 extending radially outward. Teeth 56 are configured to engage with a corresponding plurality of teeth 58 that extend radially inwardly from a shoulder 60 of a second housing 23, positioned inwardly of first housing 20.

Bosses 50 also form pairs of secondary guide surfaces 62, along which each of a pair of secondary pawls 64 slides. In a preferred embodiment, secondary pawls 64 are diametrically opposed from one another, and are disposed 90° with respect to primary pawls 54 such that they travel in a direction substantially perpendicular to the direction of travel of primary pawls 54. Secondary pawls also have a plurality of teeth 56 that extend radially outward, and which are configured to engage with teeth 58 of second housing 23. Primary and secondary pawls 54, 64 each have a first outwardly extending cam engaging member such as projection 66 on an outer surface thereof, and a second cam engaging member such as flange 68 formed on a radially inward edge thereof.

Primary and secondary pawls 54, 64 preferably have identical construction. This commonality of parts allows for reduced manufacturing costs and ease of assembly. Having two pairs of pawls allows for the elements of hinge assembly 10 to be constructed of thinner, and, consequently, lighter materials, which is advantageous in the assembly of motor vehicles. Additionally, having two pairs of pawls helps to reduce chuck, and provides additional resistance to impact forces. By configuring primary pawls 54 and secondary pawls 64 to be driven independently into engagement with teeth 58 of second housing 23, full engagement of both sets of pawls is ensured for a wide range of manufacturing tolerances.

In certain preferred embodiments, a shim plate 70 may be positioned on an inner side of first housing 20. Shim plate 70 has apertures 72 configured to receive bosses 50 such that shim plate 70 sits substantially flush on the inner side of first housing 20. A central aperture 74 in shim plate 70 receives cam locking member 28 and primary cam 76. In certain preferred embodiments, shim plate 70 may be manufactured of cold rolled steel, plastic, or any other suitable material, while first housing 20 may be stamped. Consequently, shim plate 70 may have a smooth finish, allowing primary and secondary pawls 54, 64 to slide with reduced friction. Further, with first housing 20 being a stamped member, the intersection of the surface of first housing 20 and bosses 50 may be slightly radiused. The use of shim plate 70 can provide a sharp corner between bosses 50 and shim plate 70, further reducing friction and enhancing the smooth movement of primary and secondary pawls 54, 64.

A primary cam 76 extends through aperture 74 in shim plate 70, aperture 49 in first housing 20, and aperture 48 in spring housing 46, and receives cam locking member 28. In a preferred embodiment, primary cam 76 is a substantially cylindrical member. A circumferential flange 78 extends radially outward from a central portion of primary cam 76 and defines a first portion 77 of primary cam 76 that extends axially outwardly from flange 78 and a second portion 79 that extends axially inwardly from flange 78. Flange 78 rides on an inner surface of shim plate 70, or on an inner surface of first housing 20 in embodiments where there is no shim plate, when hinge assembly 10 is in its assembled condition. A pair of diametrically opposed primary camming surfaces 80 are formed along the peripheral edge of flange 78 and engage cam engaging surfaces 68 of primary pawls 54, as described in greater detail below. Each of a pair of radially inward extending projections 82 on primary cam 76 engages with a pair of corresponding ribs 84 formed on cam locking member 28 (seen more clearly in FIG. 6), rotatably securing primary cam 76 and cam locking member 28 together, so that they rotate as a single unit.

It is to be appreciated that the cam locking member and primary cam on the mating hinge assembly on the right side of the vehicle seat may rotate independently of one another during engagement. Specifically, the primary cam may rotate more than the cam locking member, e.g., up to approximately 10° more in certain embodiments, in order to allow for full engagement of both sides of the vehicle seat when seat back twist is present.

A secondary cam 88 is positioned inwardly of primary and secondary pawls 54, 64. In a preferred embodiment, secondary cam 88 is a plate. A central aperture 90 is formed in secondary cam 88, and receives cam locking member 28 and primary cam 76. A pair of diametrically opposed flanges 92 is formed on aperture 90 and engages with walls of recesses 86 of primary cam 76 as cam locking member 28 and primary cam 76 are rotated, as described in greater detail below with respect to FIG. 6. Secondary cam 88 has a first pair of diametrically opposed slots 94 formed therein that extend substantially circumferentially. Slots 94 have a first camming edge 96 and a second camming edge 98, each of camming edge 96 and 98 extending in a substantially circumferential direction along secondary cam 88, with second camming edge 98 positioned radially outward of first camming edge 96. As described in greater detail below, first camming edges 96 cooperate with projections 66 of secondary pawls 64 to force secondary pawls 64 radially outward into their engaged, or locked, position with teeth 58 of second housing 23 as primary cam 76 rotates in its engaging direction. Second camming edges 98 serve to force secondary pawls 64 into their disengaged, or unlocked, position, free from teeth 58 of second housing 23 as primary cam 76 rotates in its disengaging direction.

Secondary cam also has a second pair of diametrically opposed slots 95 formed therein, extending substantially circumferentially, and disposed 90° from slots 94. The radially outward edge of each slot 95 is a camming edge 97. As described in greater detail below, camming edges 97 cooperate with projections 66 of primary pawls 54 to force primary pawls 54 into their disengaged, or unlocked, position, free from teeth 58 of second housing 23 as primary cam 76 rotates in its disengaging direction.

A secondary spring 100 is positioned outward of secondary cam 88 and serves to bias secondary cam 88 in a rotating manner with respect to primary cam 76. In the illustrated embodiment, secondary spring 100 is a disk spring having a pair of arms 101. It is to be appreciated that other types of springs or biasing members are considered to be within the scope of the present invention, including, for example, clock springs and tension springs. Other suitable biasing members will become readily apparent to those skilled in the art, given the benefit of this disclosure. Additionally, it is to be appreciated that secondary spring 100 can be comprised of more than one spring member. A central aperture 102 is formed in secondary spring 100 and receives primary cam 76 and cam locking member 28. A pair of diametrically opposed flanges 104 are formed on aperture 102 and are captured by corresponding recesses 105 formed in primary cam 76 such that secondary spring 100 rotates with primary cam 76. Ends 106 of arms 101 are captured by projections 108 formed on the outer side of secondary cam 88 such that arms 101 act to bias secondary cam 88 with respect to primary cam 76.

Figure 4:
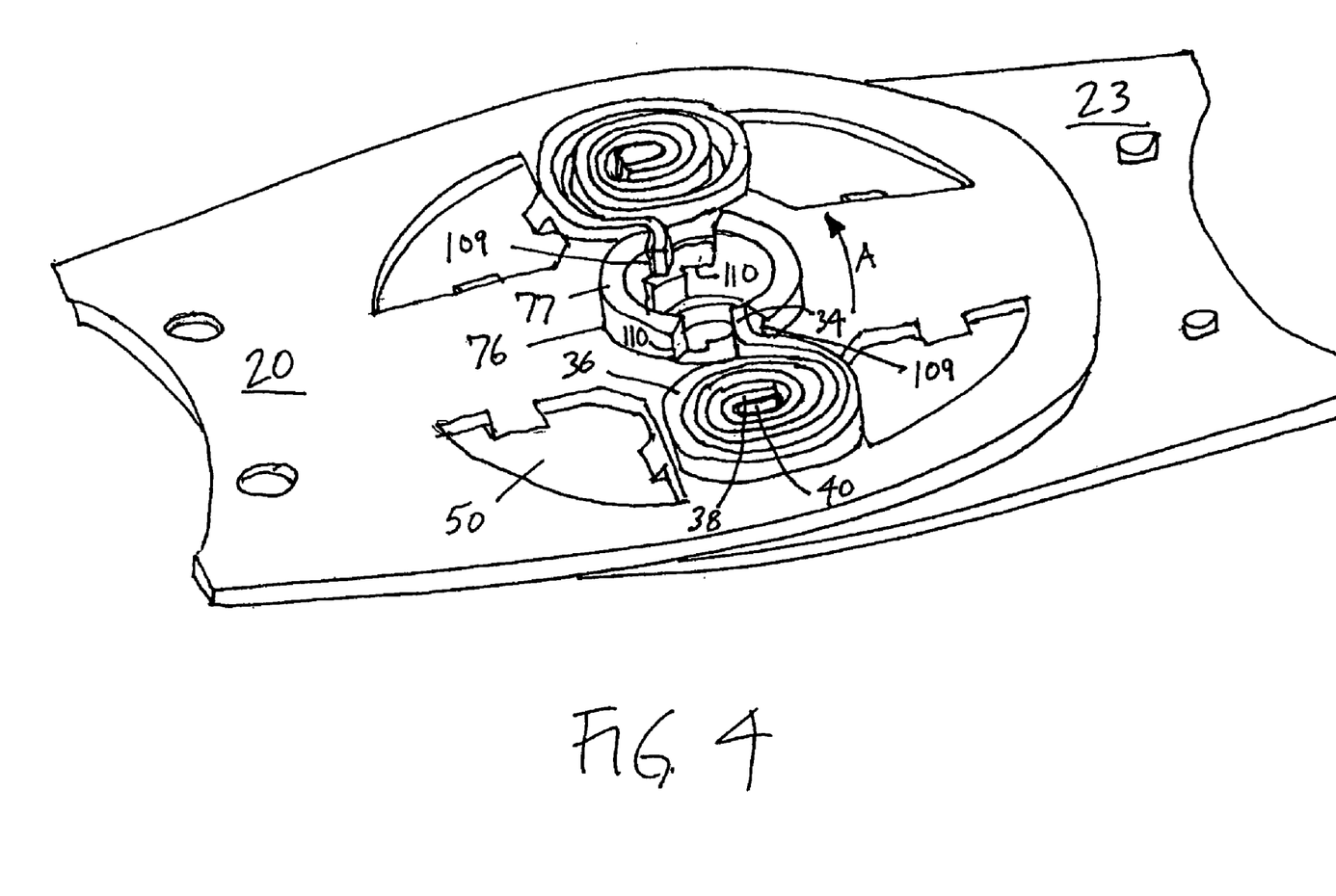
FIG. 4 is a perspective view of the hinge assembly of FIG. 1, shown partially assembled and illustrating the engagement of primary springs with a primary cam.
Figure 5:
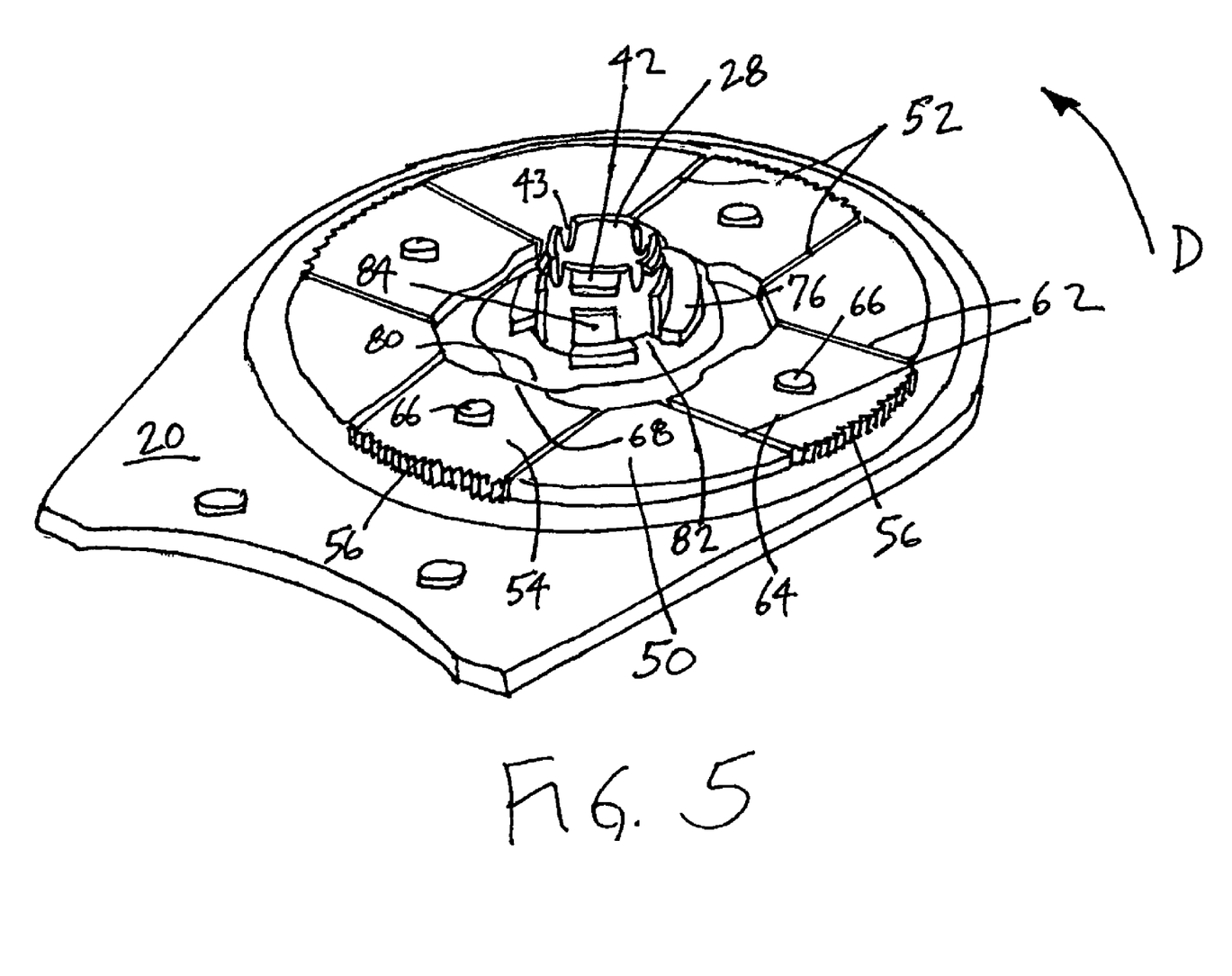
FIG. 5 is a perspective view of the hinge assembly of FIG. 1, shown partially assembled and illustrating the operation of the primary cam with the primary pawls.

In the engaged, locked, or typical operating condition, as seen in FIG. 4, each first end 34 of a primary spring 36 engages with a wall 109 of one of an opposed pair of recesses 110 formed in outer portion 77 of primary cam 76. The spring force of primary springs 36 biases primary cam 76 in the direction of arrow A, which is counter-clockwise as illustrated in FIG. 4. In this condition, as illustrated in FIG. 5, camming surfaces 80 of primary cam 76 are in an engaged position with cam engaging surfaces 68 of primary pawls 54, such that pawls 54 are in their radially outward position along primary guide surfaces 52, and teeth 56 of primary pawls 54 are engaged with teeth 58 of second housing 23.

Figure 6:
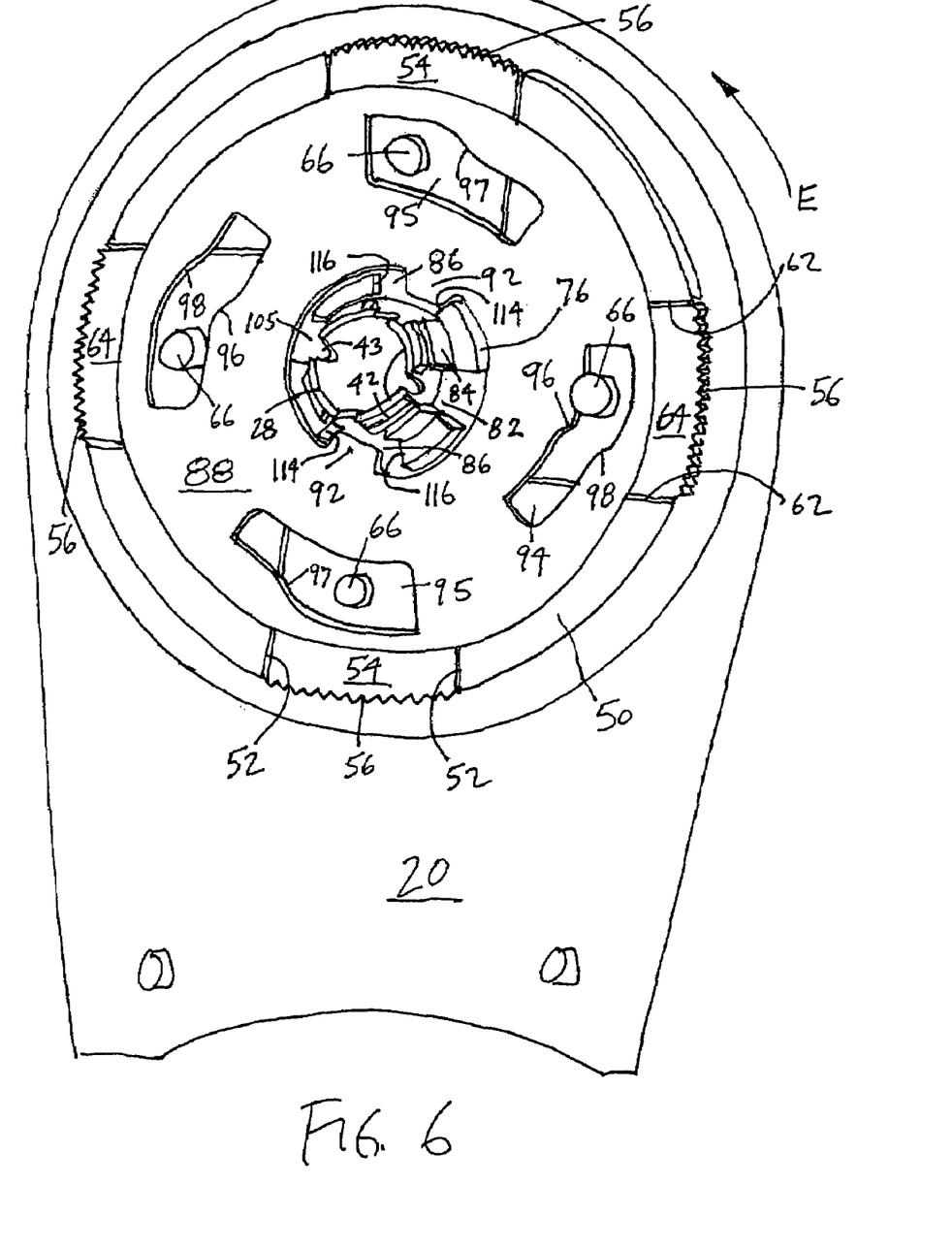
FIG. 6 is a perspective view of the hinge assembly of FIG. 1, shown partially assembled and illustrating the operation of the secondary cam and the secondary pawls.

As can be seen in FIG. 6, flanges 92 of secondary cam 88 are positioned between first and second walls 114, 116 of recesses 86. Projections 66 of primary pawls 54 and secondary pawls 64 are positioned within slots 95, 94, respectively, of secondary cam 88. In the engaged, or locked position, as illustrated in FIG. 6, first camming edges 96 are engaged with projections 66 of secondary pawls 65 such that secondary pawls 64 are in their radially outward positions along secondary guide surfaces 62 and teeth 56 of secondary pawls 64 are engaged with teeth 58 of second housing 23.

Figure 7:
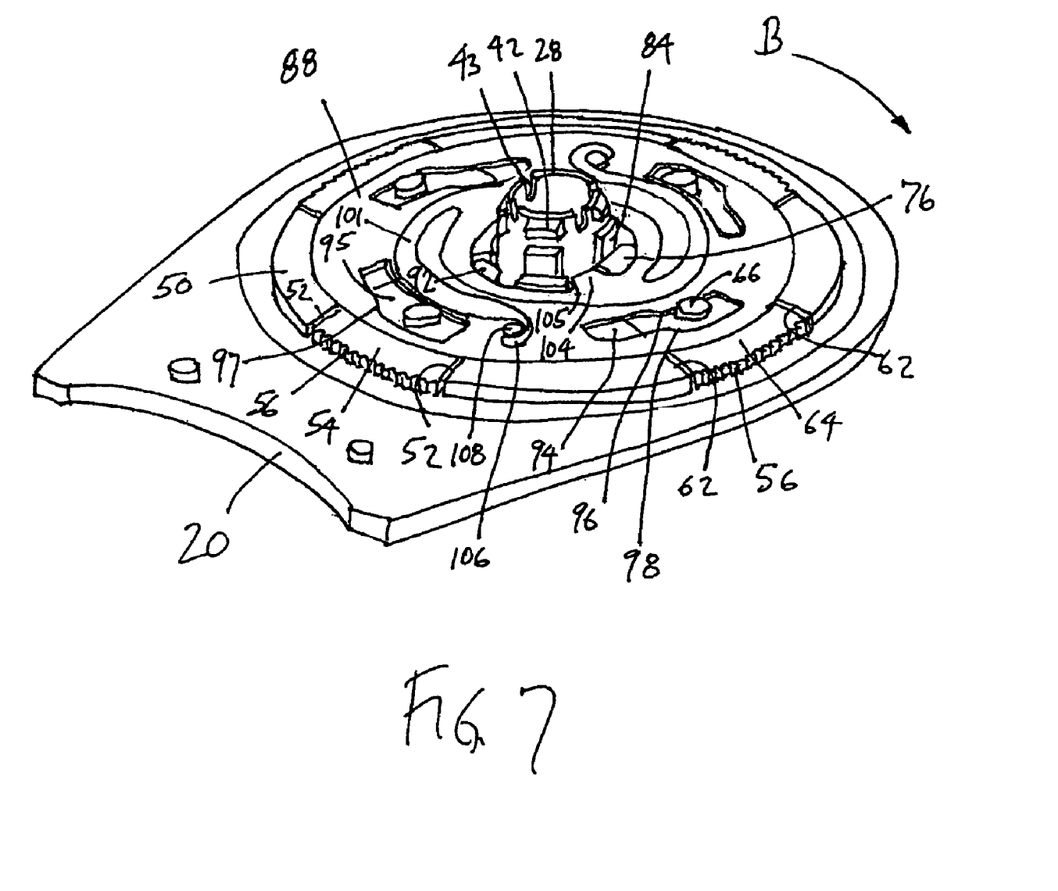
FIG. 7 is a perspective view of the hinge assembly of FIG. 1, shown partially assembled and illustrating the operation of the secondary spring and the secondary cam.

As seen in FIG. 7, flanges 104 formed on aperture 102 of secondary spring 100 are captured in recesses 105 formed in primary cam 76, securing secondary spring 100 to primary cam 76, and causing secondary spring 100 to rotate with primary cam 76. Arms 101 of secondary spring 100 act on projections 108 of secondary cam 88, biasing secondary cam 88 with respect to primary cam 76. As illustrated in FIG. 7, secondary cam 88 is biased in the direction of arrow B (clockwise as illustrated here) such that projections 92 of secondary cam 88 are biased toward first walls 114 of recess 112 of primary cam 76.

The operation of hinge assembly 10 will now be described in conjunction with FIGS. 1, 4-7. In order to adjust the position of seat back 16, primary pawls 54 and secondary pawls 64 must be moved from their engaged or locked position with teeth 58 of second housing 23 to their disengaged or unlocked position. To disengage the pawls and allow seatback 16 to pivot, lever arm 24 is grasped and pulled by the user. Lever arm 24 acts through link arm 26 and flange 27 to rotate cam locking member 28, and necessarily primary cam 76, in a disengaging direction, against the biasing force of primary springs 36. As illustrated in FIG. 1, the disengaging direction for cam locking member 28 and primary cam 76 is clockwise in the direction of arrow C.

As can be seen in FIG. 5, as primary cam 76 rotates in the disengaging direction (counterclockwise in the direction of arrow D as seen here), camming surfaces 80 move out of their engaged position with camming surfaces 68 of primary pawls 54. As primary cam 76 rotates (counterclockwise in the direction of arrow E as seen in FIG. 6), first walls 114 of recesses 112 of primary cam 76 engage flanges 92 of secondary cam 88, causing secondary cam 88 to rotate with primary cam 76. As secondary cam 88 rotates, projections 66 transition from riding along first camming surfaces 96 to riding along second camming surfaces 98. Second camming surfaces 98 urge secondary pawls 64 radially inward, freeing teeth 56 of secondary pawls 64 from teeth 58 of second housing 23. Similarly, projections 66 of primary pawls 54 ride along camming surfaces 97 of slots 95 such that primary pawls 54 are urged radially inward, freeing teeth 56 of primary pawls 54 from teeth 58 of second housing 23. Consequently, both primary pawls 54 and secondary pawls 64 are moved to their disengaged, or unlocked position, and seat back 16 is free to pivot with respect to seat pan 14.

Once seat back 16 is pivoted to a desired position, lever 24 is released. Primary springs 36 consequently cause primary cam 76 to rotate in an engaging direction (counterclockwise as seen in FIG. 4 and clockwise as seen in FIG. 5) such that primary camming surfaces 80 engage cam engaging surfaces 68 of primary pawls 54, urging primary pawls 54 radially outward along primary guide surfaces 52 until teeth 56 of primary pawls 54 engage teeth 58 of second housing 23.

Similarly, as primary cam 76 rotates in the engaging direction (clockwise as seen in FIG. 6, second walls 116 of recesses 86 engage flanges 92 of secondary cam 88, causing secondary cam 88 to rotate with primary cam 76. As secondary cam 88 rotates, first camming surfaces 96 engage projections 66, urging secondary pawls 64 radially outward along secondary guide surfaces 62 until teeth 56 of secondary pawls 64 engage teeth 58 of second housing 23.

In certain preferred embodiments, hinge assembly 10 is constructed such that as primary cam 76 rotates in the engaging direction, secondary pawls 64 engage teeth 58 slightly before primary pawls 54 engage teeth 58. Further, in certain preferred embodiments, as primary cam 76 rotates in the disengaging direction, primary pawls 54 are disengaged from teeth 58 slightly before secondary pawls 64 are disengaged from teeth 58.

The sequence of engagement and disengagement of primary pawls 54 and secondary pawls 64 with teeth 58 is controlled by the construction of primary cam 76 and secondary cam 88. Specifically, it is the positioning of first camming edge 96 and second camming edge 98 along slot 94, the positioning of camming surface 97 along slot 95, the angular positioning of recesses 112 on primary cam 97, and the width of recesses 112 that controls the timing of engagement and disengagement of primary pawls 54 and secondary pawls 64.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A reclining vehicle seat hinge assembly comprising, in combination:
   a first housing;
   a second housing rotatable with respect to the first housing, and having a circular shoulder and a plurality of teeth extending radially inward from the shoulder;
   a primary cam rotatable with respect to the first housing and having a pair of primary camming surfaces;
   a secondary cam rotatably driveable by the primary cam and having a plurality of camming surfaces;
   a pair of diametrically opposed primary pawls, each primary pawl slidable radially with respect to the first housing, having a first and a second cam engaging member and a plurality of radially outward extending teeth, and configured to be driven radially outward by engagement with the primary cam into an engaged position where the teeth of the primary pawl engage with the teeth of the second housing, and to be driven radially inward by the secondary cam into a disengaged position where the teeth of the primary pawl are free of the teeth of the second housing;
   a pair of diametrically opposed secondary pawls, each secondary pawl slidable radially with respect to the first housing, having a plurality of radially outward extending teeth, and configured to be driven radially outward by engagement with the secondary cam into an engaged position where the teeth of the secondary pawl engage with the teeth of the second housing, and to be driven radially inward by engagement with the secondary cam into a disengaged position where the teeth of the secondary pawl are free of the teeth of the second housing.

2. The reclining vehicle seat hinge assembly of claim 1, further comprising a primary spring operable to bias the primary cam into an engaged position.

3. The reclining vehicle seat hinge assembly of claim 1, further comprising a secondary spring operable to rotatably bias the secondary cam with respect to the primary cam.

4. The reclining vehicle seat hinge assembly of claim 1, wherein the first housing has a plurality of guide surfaces along which the primary pawls and secondary pawls travel.

5. The reclining vehicle seat hinge assembly of claim 1, wherein the secondary cam comprises
   a first pair of diametrically opposed slots having first and second camming surfaces configured to drive the secondary pawl into engaged and disengaged positions; and
   a second pair of diametrically opposed slots having a camming surface configured to engage a corresponding primary pawl to drive the primary pawl into the disengaged position.

6. A reclining vehicle seat hinge assembly comprising, in combination:
   a seat pan;
   a seat back pivotally connected to the seat pan; and
   a hinge assembly pivotally connecting the seat back to the seat pan and comprising
      a first housing secured to the seat pan and having a plurality of radially extending guide surfaces;
      a second housing secured to the seat back, pivotable with respect to the first housing, and having a circular shoulder and a plurality of teeth extending radially inward from the shoulder;
   primary cam rotatable with respect to the first housing and having a pair of primary camming surfaces;
   secondary cam rotatably driveable by the primary cam and having a plurality of camming surfaces;
   pair of primary pawls, each primary pawl slidable radially along one of the guide surfaces with respect to the first housing upon engagement with a corresponding primary camming surface of the primary cam and a corresponding camming surface of the secondary cam, and having a plurality of radially outward extending teeth engageable with the teeth of the second housing; and
   pair of secondary pawls, each secondary pawl slidable radially along one of the guide surfaces with respect to the first housing upon engagement with a corresponding camming surface of the secondary cam and having a plurality of radially outward extending teeth engageable with the teeth of the second housing, the secondary pawls having a construction identical to that of the primary pawls such that the primary and secondary pawls are interchangeable with one another.

7. The reclining vehicle seat hinge assembly of claim 6, further comprising a first primary spring operable to bias the primary cam into an engaged position.

8. The reclining vehicle seat hinge assembly of claim 7, further comprising a second primary spring, the first and second primary springs cooperating to bias the primary cam into the engaged position.

9. The reclining vehicle seat hinge assembly of claim 8, wherein the first and second primary springs are clock springs.

10. The reclining vehicle seat hinge assembly of claim 6, further comprising a secondary spring operable to rotatably bias the secondary cam with respect to the primary cam.

11. The reclining vehicle seat hinge assembly of claim 10, wherein the secondary spring is a disk spring.

12. The reclining vehicle seat hinge assembly of claim 6, wherein the secondary cam comprises a plate having:
   a first pair of slots, each of which has first and second camming edges; and
   a second pair of slots, each of which has a camming edge.

13. The reclining vehicle seat hinge assembly of claim 12, wherein each secondary pawl further comprises a first cam engaging member and a second cam engaging member, the first and second camming edges of each slot of the first pair of slots being configured to engage the first cam engaging member of a corresponding secondary pawl, respectively, to drive the secondary pawl into the engaged and disengaged positions.

14. The reclining vehicle seat hinge assembly of claim 12, wherein each primary pawl further comprises a first cam engaging member and a second cam engaging member, the camming edge of each slot of the second pair of slots being configured to engage the first cam engaging member of a corresponding primary pawl to drive the primary pawl into the disengaged position, and the primary camming surface of the primary cam being configured to engage the second cam engaging member of a corresponding primary pawl to drive the primary pawl into the engaged position.

15. The reclining vehicle seat assembly of claim 6, further comprising a cam locking member and a washer, the cam locking member and washer cooperating to secure the first and second housings together.

16. A reclining vehicle seat hinge assembly comprising, in combination:
   a first housing having a plurality of guide surfaces formed thereon;
   a second housing rotatable with respect to the first housing, and having a circular shoulder and a plurality of teeth extending radially inward from the shoulder;
   a primary cam rotatable with respect to the first housing and having a pair of primary camming surfaces;
   a primary spring engageable with the primary cam to bias the primary cam into an engaged position;
   a secondary cam rotatably driveable by the primary cam and having a first pair of diametrically opposed slots having first and second camming surfaces, and a second pair of diametrically opposed slots having a camming surface;
   a secondary spring engageable with the secondary cam to rotatably bias the secondary cam with respect to the primary cam;
   a pair of diametrically opposed primary pawls, each primary pawl slidable along a corresponding pair of guide surfaces of the first housing, having a plurality of radially outward extending teeth and a first and a second cam engaging member, the second camming member engageable by a corresponding primary camming surface of the primary cam to drive the primary pawl into an engaged position where the teeth of the primary pawl engage with the teeth of the second housing, the first cam engaging member of the primary pawl engageable by a camming surface of a corresponding one of the second pair of slots to drive the primary pawl into a disengaged position where the teeth of the primary pawl are free of the teeth of the second housing;
   a pair of diametrically opposed secondary pawls, each secondary pawl slidable along a corresponding pair of guide surfaces of the first housing, having a plurality of radially outward extending teeth and first and second cam engaging members, the first cam engaging member of the secondary pawl engageable by a corresponding first camming surface of a corresponding one of the first pair of slots to drive the secondary pawl radially outward into an engaged position where the teeth of the secondary pawl engage with the teeth of the second housing, the first cam engaging member of the secondary pawl engageable by a corresponding second camming surface of the corresponding one of the first pair of slots to drive the secondary pawl into a disengaged position where the teeth of the secondary pawl are free of the teeth of the second housing.

17. The reclining vehicle seat hinge assembly of claim 16, further comprising a second primary spring, the first and second primary springs cooperating to bias the primary cam into an engaged position.

18. The reclining vehicle seat hinge assembly of claim 17, wherein the first and second primary springs are clock springs.

19. The reclining vehicle seat hinge assembly of claim 16, further comprising a secondary spring operable to rotatably bias the secondary cam with respect to the primary cam.

20. The reclining vehicle seat hinge assembly of claim 19, wherein the secondary spring is a disk spring.

21. The reclining vehicle seat assembly of claim 16, further comprising a cam locking member and a washer, the cam locking member and washer cooperating to secure the first and second housings together.

22. A reclining vehicle seat hinge assembly comprising, in combination:
   a first housing;
   a second housing rotatable with respect to the first housing, and having a plurality of radially extending teeth;
   a primary cam rotatable with respect to the first housing and having a pair of primary camming surfaces;
   a secondary cam driveable by the primary cam and having a plurality of camming surfaces;
   a pair of primary pawls, each primary pawl slidable radially with respect to the first housing, having a first cam engaging member, a second cam engaging member and a plurality of radially extending teeth, the first cam engaging member of the primary pawl configured to be driven by a corresponding camming surface of the secondary cam into a disengaged position where the teeth of the primary pawl are free of the teeth of the second housing, the second cam engaging member of the primary pawl configured to be driven by engagement with a corresponding primary camming surface of the primary cam into an engaged position where the teeth of the primary pawl engage with the teeth of the second housing;
   a pair of secondary pawls, each secondary pawl slidable radially with respect to the first housing, having a first cam engaging member, a second cam engaging member and a plurality of radially extending teeth, the second cam engaging member of the secondary pawl configured to be driven by engagement with a corresponding camming surface of the secondary cam into an engaged position where the teeth of the secondary pawl engage with the teeth of the second housing, and to be driven by engagement with a corresponding camming surface of the secondary cam into a disengaged position where the teeth of the secondary pawl are free of the teeth of the second housing.

23. The reclining vehicle seat hinge assembly of claim 22, further comprising a first primary spring operable to bias the primary cam into an engaged position.

24. The reclining vehicle seat hinge assembly of claim 23, further comprising a second primary spring, the first and second primary springs cooperating to bias the primary cam into an engaged position.

25. The reclining vehicle seat hinge assembly of claim 24, wherein the first and second primary springs are clock springs.

26. The reclining vehicle seat hinge assembly of claim 22, further comprising a secondary spring operable to rotatably bias the secondary cam with respect to the primary cam.

27. The reclining vehicle seat hinge assembly of claim 26, wherein the secondary spring is a disk spring.

28. The reclining vehicle seat hinge assembly of claim 22, wherein the first housing has a plurality of guide surfaces along which the primary pawls and secondary pawls travel.

29. The reclining vehicle seat hinge assembly of claim 22, wherein the secondary cam comprises a plate having
- a first pair of slots, each of which has first and second camming edges configured to engage the first cam engaging member of a corresponding secondary pawl, respectively, to drive the secondary pawl into the engaged and disengaged positions, respectively; and
- a second pair of slots, each of which has a camming edge configured to engage the first cam engaging member of a corresponding primary pawl to drive the primary pawl into the disengaged position.

30. The reclining vehicle seat hinge assembly of claim 22, further comprising a cam locking member and a washer, the cam locking member and washer cooperating to secure the first and second housings together.

31. A reclining vehicle seat hinge assembly comprising, in combination:
- a seat pan;
- a seat back pivotally connected to the seat pan; and
- a hinge assembly pivotally connecting the seat back to the seat pan and comprising
  - a first housing secured to the seat pan and having a plurality of radially extending guide surfaces;
  - a second housing secured to the seat back, pivotable with respect to the first housing, and having a circular shoulder and a plurality of teeth extending radially inward from the shoulder;
  - a primary cam rotatable with respect to the first housing and having a pair of primary camming surfaces;
  - a secondary cam rotatably driveable by the primary cam and having a plurality of camming surfaces;
  - a pair of primary pawls, each primary pawl slidable radially along one of the guide surfaces with respect to the first housing upon engagement with a corresponding primary camming surface of the primary cam and a corresponding camming surface of the secondary cam, and having a plurality of radially outward extending teeth engageable with the teeth of the second housing; and
  - a pair of secondary pawls, each secondary pawl configured to be driven radially along one of the guide surfaces outward with respect to the first housing upon engagement with a corresponding camming surface of the secondary cam and having a plurality of radially outward extending teeth engageable with the teeth of the second housing.

32. The reclining vehicle seat assembly of claim 31, wherein the secondary pawls have a construction essentially identical to that of the primary pawls.

* * * * *